(12) United States Patent
Yoshimi

(10) Patent No.: US 11,032,141 B2
(45) Date of Patent: Jun. 8, 2021

(54) SIGNAL PROCESSING APPARATUS AND PARAMETER SETTING METHOD FOR THE APPARATUS

(71) Applicant: DENSO TEN Limited, Kobe (JP)

(72) Inventor: Kazuya Yoshimi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/396,811

(22) Filed: Apr. 29, 2019

(65) Prior Publication Data
US 2019/0342163 A1   Nov. 7, 2019

(30) Foreign Application Priority Data

May 7, 2018 (JP) .............................. JP2018-089236

(51) Int. Cl.
| | |
|---|---|
| *H04L 12/24* | (2006.01) |
| *H04L 29/12* | (2006.01) |
| *H04W 4/80* | (2018.01) |
| *H04W 4/48* | (2018.01) |
| *H04M 9/08* | (2006.01) |

(52) U.S. Cl.
CPC ...... *H04L 41/0813* (2013.01); *H04L 61/2038* (2013.01); *H04M 9/082* (2013.01); *H04W 4/48* (2018.02); *H04W 4/80* (2018.02)

(58) Field of Classification Search
CPC .. H04L 41/0813; H04L 61/2038; H04W 4/48; H04W 4/80; H04M 9/082
See application file for complete search history.

(56) References Cited

U.S. PATENT DOCUMENTS

| | | | |
|---|---|---|---|
| 6,463,390 B1* | 10/2002 | Miyamori | G10H 1/0008 702/66 |
| 2005/0019021 A1* | 1/2005 | Takahashi | H04H 60/04 386/338 |
| 2009/0037831 A1* | 2/2009 | Best | G06F 9/451 715/764 |
| 2014/0281018 A1* | 9/2014 | Waclawsky | H04L 47/193 709/235 |

FOREIGN PATENT DOCUMENTS

JP     2007-060229 A    3/2007

* cited by examiner

*Primary Examiner* — Viet D Vu
(74) *Attorney, Agent, or Firm* — Oliff PLC

(57) ABSTRACT

A signal processing apparatus includes: a memory, a signal processor, and a microcomputer. The memory stores a setting file including: a common portion that holds at least one common parameter that is used in common for functions performed by the signal processing apparatus; individual portions that each individually hold parameters; and a changer that holds change information to change the at least one common parameter. The microcomputer (a) reads the common portion and the individual portions from the memory, and sends the read portions to the signal processor, and (b) selects one of the functions, and controls the signal processor in accordance with the selected function and the change information so that the signal processor uses i) the parameter in the individual portion corresponding to the selected function, and ii) the at least one common parameter of the common portion that has been changed based on the change information.

6 Claims, 8 Drawing Sheets

| | COLLECTIVE CHANGE ADDRESS TABLE<br>FUNCTION 1: 1001h<br>FUNCTION 2: 1010h<br>FUNCTION 3: 1020h<br>FUNCTION 4: 1030h<br>FUNCTION 5: 1040h<br>FUNCTION 6: 1050h<br>FUNCTION 7: 1060h |
|---|---|
| | INDIVIDUAL CHANGE ADDRESS TABLE<br>FUNCTION 1: 2001h<br>FUNCTION 2: 2010h<br>FUNCTION 3: 2020h<br>FUNCTION 4: 2030h<br>FUNCTION 5: 2040h<br>FUNCTION 6: 2050h<br>FUNCTION 7: 2060h |
| TOP ADDRESS 1001h | COLLECTIVE CHANGE TABLE A |
| TOP ADDRESS 1010h | COLLECTIVE CHANGE TABLE B |
| TOP ADDRESS 1020h | COLLECTIVE CHANGE TABLE C |
| TOP ADDRESS 1030h | COLLECTIVE CHANGE TABLE D |
| TOP ADDRESS 1040h | COLLECTIVE CHANGE TABLE E |
| TOP ADDRESS 2050h | COLLECTIVE CHANGE TABLE F |
| TOP ADDRESS 1060h | COLLECTIVE CHANGE TABLE G |
| COLLECTIVE REWRITING PARAMETER GROUP ||
| TOP ADDRESS 2001h | INDIVIDUAL CHANGE TABLE A |
| TOP ADDRESS 2010h | INDIVIDUAL CHANGE TABLE B |
| TOP ADDRESS 2020h | INDIVIDUAL CHANGE TABLE C |
| TOP ADDRESS 2030h | INDIVIDUAL CHANGE TABLE D |
| TOP ADDRESS 2040h | INDIVIDUAL CHANGE TABLE E |
| TOP ADDRESS 2050h | INDIVIDUAL CHANGE TABLE F |

FIG. 3A

| | COLLECTIVE CHANGE ADDRESS TABLE<br>FUNCTION 1: 1001h<br>FUNCTION 2: 1010h<br>FUNCTION 3: 1010h<br>FUNCTION 4: 1010h<br>FUNCTION 5: 1010h<br>FUNCTION 6: 1010h<br>FUNCTION 7: 1010h |
|---|---|
| | INDIVIDUAL CHANGE ADDRESS TABLE<br>FUNCTION 1: 2001h<br>FUNCTION 2: 2010h<br>FUNCTION 3: 2010h<br>FUNCTION 4: 2010h<br>FUNCTION 5: 2010h<br>FUNCTION 6: 2010h<br>FUNCTION 7: 2010h |
| TOP ADDRESS 1001h | COLLECTIVE CHANGE TABLE A |
| TOP ADDRESS 1010h | COLLECTIVE CHANGE TABLE B |
| COLLECTIVE REWRITING PARAMETER GROUP | |
| TOP ADDRESS 2001h | INDIVIDUAL CHANGE TABLE A |
| TOP ADDRESS 2010h | INDIVIDUAL CHANGE TABLE B |

FIG. 3B

| PARAMETER ADDRESS | PARAMETER VALUE | CONTENT |
| --- | --- | --- |
| 1001h | 000A00h | FIRST NUMBER OF CHANGES |
| 1002h | 200000h | TOP ADDRESS OF FIRST ELIMINATION PARAMETER GROUP |
| 1003h | 000000h | TOP ADDRESS OF FIRST REWRITING PARAMETER GROUP |
| 1004h | 000500h | SECOND NUMBER OF CHANGES |
| 1005h | 210000h | TOP ADDRESS OF SECOND ELIMINATION PARAMETER GROUP |
| 1006h | 010000h | TOP ADDRESS OF SECOND REWRITING PARAMETER GROUP |
| 1007h | 000000h | THIRD NUMBER OF CHANGES |

FIG. 4

| PARAMETER ADDRESS | PARAMETER VALUE | CONTENT |
|---|---|---|
| 2001h | 000200h | NUMBER OF CHANGES |
| 2002h | 000100h | ADDRESS OF FIRST ELIMINATION PARAMETER |
| 2003h | 100000h | FIRST CHANGE VALUE |
| 2004h | 000200h | ADDRESS OF SECOND ELIMINATION PARAMETER |
| 2005h | 200000h | SECOND CHANGE VALUE |

FIG. 5

SIGNAL PROCESSING APPARATUS AND PARAMETER SETTING METHOD FOR THE APPARATUS

BACKGROUND OF THE INVENTION

Field of the Invention

The invention relates to a technology for setting a parameter that is used by a signal processing apparatus.

Description of the Background Art

A variety of handsfree communication apparatuses that are used in a cabin of a vehicle have been developed. In many cases, the handsfree communication apparatuses include a sound signal processor that performs sound signal processing, such as echo cancellation and noise cancellation for a sound signal.

Moreover, the handsfree communication apparatuses include many functions, for example, a function of short range wireless communication, such as BLUETOOTH (registered trademark), with a mobile phone and a smartphone, and a function of wired communication with a mobile phone and a smartphone via a USB cable or the like The function of the short range wireless communication with the mobile phone and the smartphone can be divided into a plurality of functional categories, depending on type of the wireless communication, whether a communication partner is a mobile phone or a smartphone, in a case where the communication partner is a smartphone, an operation system (OS) of the smartphone, etc. Similarly, the function of the wired communication with the mobile phone and the smartphone can be divided into a plurality of functional categories, depending on type of the wired communication, whether a communication partner is a mobile phone or a smartphone, in the case where the communication partner is a smartphone, the OS of the smartphone, etc.

The handsfree communication apparatus sets a parameter in accordance with a function that is selected via a user operation and the like, as a parameter that is used by the sound signal processor. The parameter is generally set and used by sending a setting file that is stored in an external memory to a memory of the sound processor.

FIG. 7 is a schematic diagram of a configuration of a conventional setting file. The setting file illustrated in FIG. 7 includes a common portion 1, a work area 2, and individual portions 3-1 to 3-7. A number of the individual portions is here seven. However, seven is only an example, and the number of the individual portions is arbitrary.

The common portion 1 holds the parameter that is used in common by a plurality of functions or all functions.

Among the parameters held by the individual portions, a parameter corresponding to the selected function is copied to the work area 2 by the signal processor.

The individual portions 3-1 to 3-7 hold the parameters, each of which is used for each function.

There is a possibility that a design of a handsfree communication apparatus is changed during development of the handsfree communication apparatus. A design change may require a change of the parameter that is used in common for the plurality of functions. Since a memory capacity of the sound signal processor that is allocated to set the parameters is limited, in a case where such a design change occurs, transmitting a file having a file size larger than a size of the setting file illustrated in FIG. 7 to the sound signal processor should be avoided.

SUMMARY OF THE INVENTION

According to one aspect of the invention, a signal processing apparatus includes: a memory, a signal processor, and a microcomputer. The memory stores a setting file including: a common portion that holds at least one common parameter that is used in common for a plurality of functions performed by the signal processing apparatus; a plurality of individual portions that each individually hold parameters, each of which is used for individual ones of the functions; and a changer that holds change information to change the at least one common parameter in the common portion. The signal processor processes a signal. The microcomputer (a) reads the common portion and the plurality of individual portions from the memory, and sends the common portion and the plurality of individual portions to the signal processor, and (b) selects one of the functions, and controls the signal processor in accordance with the selected function and the change information so that the signal processor uses i) the parameter in the individual portion corresponding to the function selected by the controller, and ii) the at least one common parameter of the common portion that has been changed based on the change information.

Thus, even in a case where the common parameter in the common portion needs to be changed due to a change in a parameter for a function, there is no need of a design change to move the common parameter in the common portion to the individual portions. Moreover, redundancy of the parameter in the individual portions can be prevented so that use efficiency of the memory is not decreased.

According to another aspect of the invention, the change information includes: collective change information that is used to collectively change a plurality of the common parameters in the common portion in a range of a plurality of serial addresses; and individual change information that is used to individually change the common parameters in the common portion for individual addresses.

Thus, it is possible to select a proper method of changing the parameter in accordance with a size of the change.

Thus, an object of the invention is to supply a technology that eliminates a need for a design change to move a common parameter in a common portion to individual portions even in a case where the common parameter in the common portion needs to be changed due to a change in a parameter for a function, and that prevents redundancy of the parameter in the individual portions so that use efficiency of the memory is not decreased.

These and other objects, features, aspects and advantages of the invention will become more apparent from the following detailed description of the invention when taken in conjunction with the accompanying drawings.

BRIEF DESCRIPTION OF THE DRAWINGS

FIG. 3A is a schematic diagram of an example of change information held by a changer;

FIG. 3B is a schematic diagram of another example of the change information held by the changer;

FIG. 4 is a schematic diagram of an example of a collective change table;

FIG. 5 is a schematic diagram of an example of an individual change table;

DESCRIPTION OF THE EMBODIMENTS

An exemplar embodiment of the invention will be described in detail with reference to the drawings.

<1. Configuration Example of Handsfree Communication Apparatus>

Figure 1:
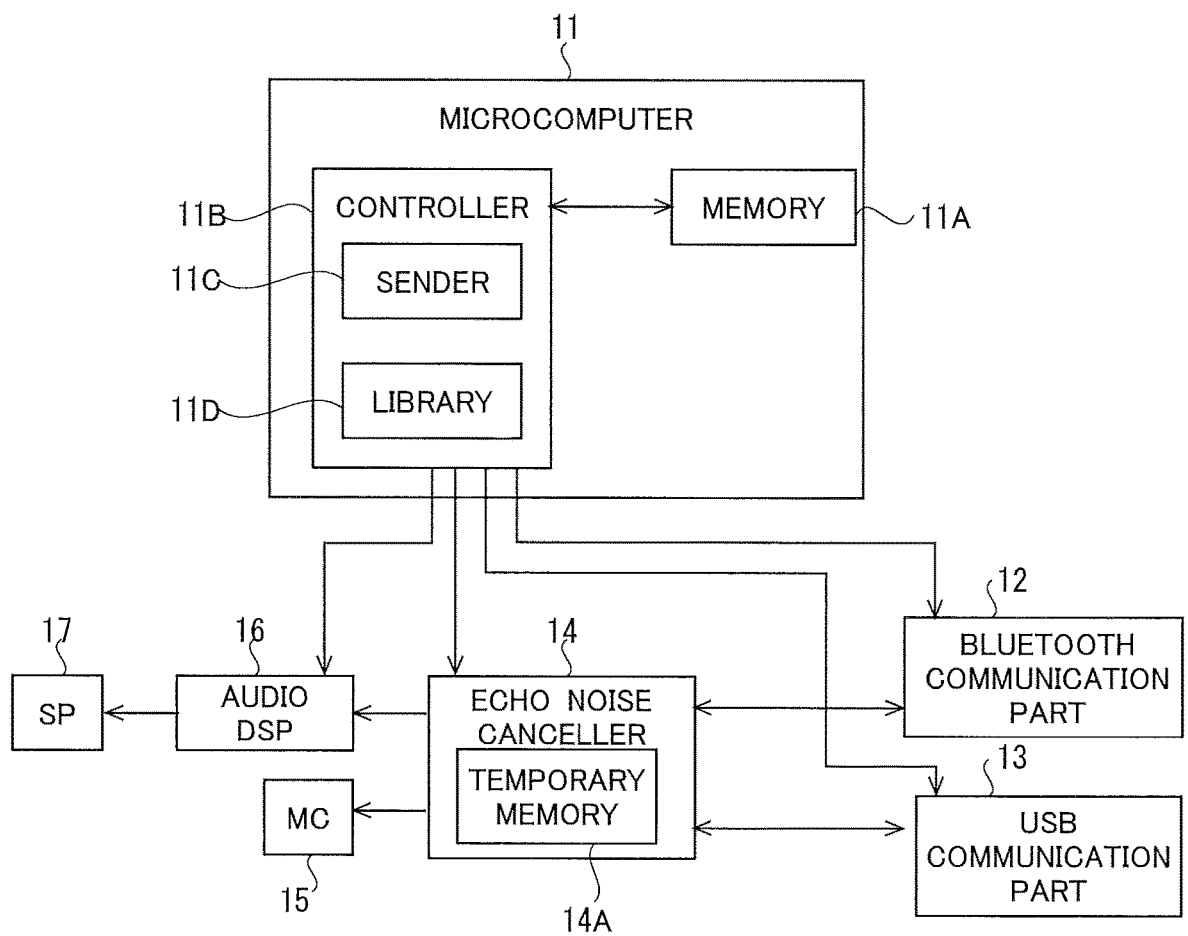
FIG. 1 illustrates a configuration example of a handsfree communication apparatus.

FIG. 1 illustrates a configuration example of a handsfree communication apparatus. The handsfree communication apparatus illustrated in FIG. 1 is a signal processor that performs an echo cancellation process and a noise cancellation process of a sound signal. The handsfree communication apparatus is installed, for example, in a cabin of a vehicle.

The handsfree communication apparatus illustrated in FIG. 1 includes a microcomputer 11, a BLUETOOTH communication part 12, a USB communication part 13, an echo noise canceller 14, a microphone 15, an audio DSP (digital signal processor) 16, and a speaker 17.

The microcomputer 11 controls the entire handsfree communication apparatus illustrated in FIG. 1. Any communication format, for example, I2C communication, may be used for communication between the microcomputer 11 and each of the BLUETOOTH communication part 12, the USB communication part 13, the echo noise canceller 14 and the audio DSP 16.

The BLUETOOTH communication part 12 communicates with a mobile phone or a smartphone via BLUETOOTH. The USB communication part 13 communicates with the mobile phone or the smartphone via a USB cable or the like. When receiving a receiver sound signal from the mobile phone or the smartphone, the BLUETOOTH communication part 12 or the USB communication part 13 sends the receiver sound signal to the echo noise canceller 14. Moreover, when receiving a sender sound signal from the echo noise canceller 14, the BLUETOOTH communication part 12 or the USB communication part 13 sends the sender sound signal to the mobile phone or the smartphone.

The echo noise canceller 14 sends, to the audio DSP 16, the receiver sound signal sent from the BLUETOOTH communication part 12 or the USB communication part 13. Moreover, the echo noise canceller 14 performs the echo cancellation process and the noise cancellation process of the sound signal output from the microphone 15 that collects sound in the cabin of the car to generate the sender sound signal. Then, the echo noise canceller 14 sends the sender sound signal to the BLUETOOTH communication part 12 or the USB communication part 13.

After performing a process, such as equalizing the receiver sound signal sent from the echo noise canceller 14, the audio DSP 16 converts the signal into an analogue sound signal by D/A convert. Then, the audio DSP 16 sends the converted analogue sound signal to the speaker 17. The speaker 17 outputs sounds based on the analogue sound signal sent from the audio DSP 16.

The handsfree communication apparatus illustrated in FIG. 1 includes a variety of functions. Some examples of the functions included in the handsfree communication apparatus illustrated in FIG. 1 are a function of BLUETOOTH communication with a mobile phone, a function of the BLUETOOTH communication with a smartphone having a first OS, a function of the BLUETOOTH communication with a smartphone having a second OS, a function of USB communication with the mobile phone, a function of the USB communication with a smartphone having the first OS and a function of the USB communication with a smartphone having the second OS. The microcomputer 11 selects a function, for example, based on a user operation, a communication status of the BLUETOOTH communication part 12 or the USB communication part 13, and the like. The microcomputer 11, for example, obtains an output signal from an operation part that receives the user operation so as to understand a content of the user operation. Moreover, for example, the microcomputer 11 causes, for example, the BLUETOOTH communication part 12 and the USB communication part 13 to report the communication status so as to understand the communication status of the BLUETOOTH communication part 12 and the USB communication part 13.

<2. Outline of Setting Parameter>

The handsfree communication apparatus illustrated in FIG. 1 resets a parameter that is used by the echo noise canceller 14 whenever a function that is selected by the microcomputer 11 is changed.

The microcomputer 11 includes a memory 11A and a controller 11B.

Figure 7:
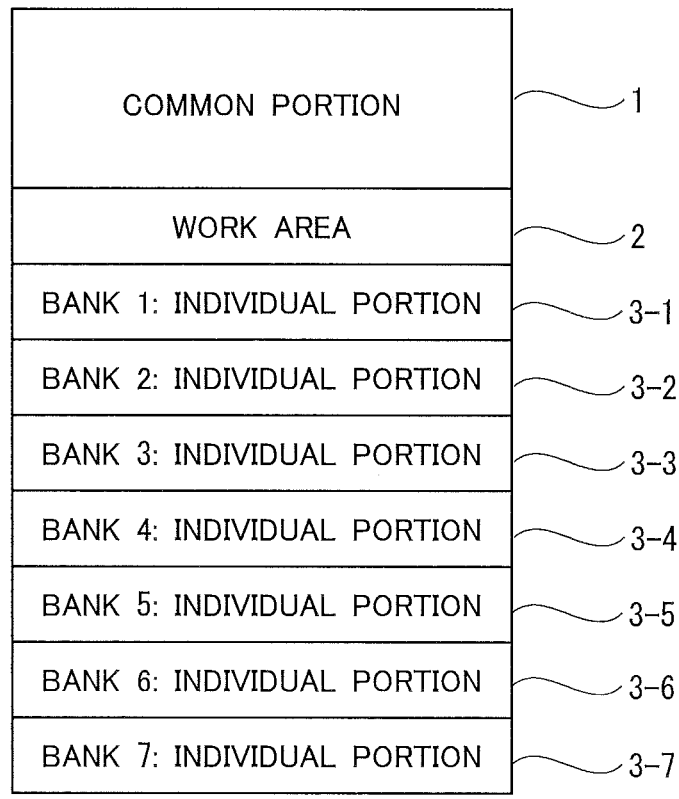
FIG. 7 is a schematic diagram of a configuration of a conventional setting file.

The memory 11A stores, in a non-volatile manner, a setting file (hereinafter referred to as "parameter file") illustrated in FIG. 2. Same numeral references are given to parts in FIG. 2 that are same as parts in FIG. 7. The parameter file illustrated in FIG. 2 has a configuration that a changer 4 is added to a conventional parameter file illustrated in FIG. 7. The changer 4 holds change information for changing a common parameter in a common portion 1.

A controller 11B selects a function, and controls the echo noise canceller 14 in accordance with the selected function and the change information held by the changer 4. In this embodiment, the controller 11B includes a sender 11C and a library 11D.

Figure 2:
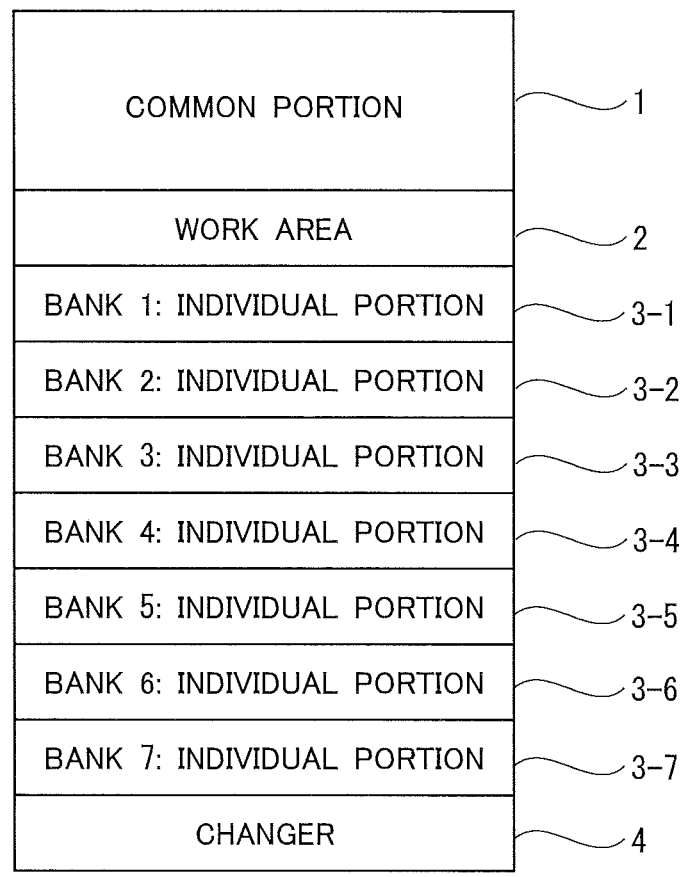
FIG. 2 is a schematic diagram of a configuration of a setting file.

When the handsfree communication apparatus illustrated in FIG. 1 is turned on and activated, the sender 11C reads out the parameter file illustrated in FIG. 2 from the memory 11A, and then causes the library 11D to memorize the parameter file. Moreover, the sender 11C sends, to the echo noise canceller 14, the common portion 1, a work area 2, and individual portions 3-1 to 3-7 of the parameter file, illustrated in FIG. 2, which the library 11D has memorized. After the common portion 1, the work area 2, the individual portions 3-1 to 3-7 are completely sent to the echo noise canceller 14, the sender 11C eliminates the common portion 1, the work area 2, and the individual portions 3-1 to 3-7 from the library 11D.

The echo noise canceller 14 includes a temporary memory 14A. The echo noise canceller 14 temporarily stores the common portion 1, the work area 2, and the individual portions 3-1 to 3-7 that are sent from the microcomputer 11, into the temporary memory 14A.

In accordance with control of the microcomputer 11, the echo noise canceller 14 copies, to the work area 2, a parameter in an individual portion (one of the individual portions 3-1 to 3-7) corresponding to the function selected by the controller 11B, among data stored in the temporary memory 14A. The echo noise canceller 14 uses the parameter copied to the work area 2.

Moreover, in accordance with the control of the microcomputer 11, the echo noise canceller 14 rewrites a part of the common parameter in the common portion 1 among the data stored in the temporary memory 14A. The echo noise canceller 14 uses the common parameter in the common portion 1 of which the part is rewritten. The part of the common parameter in the common portion 1 is changed based on the change information held by the changer 4.

As described above, the method that employs the parameter in the individual portion corresponding to the function selected by the controller 11B and the method that rewrites a part of the common parameter in the common portion 1 are both used. Thus, it is possible to prevent the data stored in the temporary memory 14A of the echo noise canceller 14 from being greater than a conventional method. Therefore, despite a limited memory capacity of the echo noise canceller 14 that is allocated for setting the parameter, it is possible to be highly flexible to a design change that needs to change the parameter that is used in common for a plurality of functions or all functions performed by the handsfree communication apparatus.

Moreover, in the case where the design change occurs that needs to change the parameter that is used in common for the plurality of functions, the handsfree communication apparatus illustrated in FIG. 1 does not need to change a control content and the like. The handsfree communication apparatus only needs to change the parameter file that is stored in the memory 11A. Therefore, the handsfree communication apparatus illustrated in FIG. 1 has a high reliability for the design change that needs to change the parameter that is used in common for the plurality of functions.

In a case where among parameters that have been scheduled to be used in common for a plurality of functions in an early stage of development, it is determined that a parameter needs to be changed for each function, the parameter that needs be changed for each function should be conventionally moved from the common portion to the individual portions. However, in order to move such a parameter from the common portion to the individual portions, a region in which the parameter is stored needs to be added to all individual portions. A parameter file of the parameter places memory areas under stress. For example, the parameter that needs to be moved from the common portion to the individual portions is stored in one unit. In a case where there are seven individual portions, a size of the common portion decreases by one unit, but the individual portions totally increase by seven units. Accordingly, a size of the parameter file increases by six units in total.

Further, in a case where the parameter that needs be changed for each function is moved from the common portion to the individual portions, even if the parameter needs to be changed only for one of the seven individual portions, the other six individual portions store a parameter having the same value. Thus, the memory is used less efficiently.

Being different from the foregoing conventional apparatus, the handsfree communication apparatus illustrated in FIG. 1 does not move the parameter to be changed for each function from the common portion to the individual portions. More specifically, the handsfree communication apparatus illustrated in FIG. 1 uses the parameter file, illustrated in FIG. 2, to which the changer 4 is provided beforehand to rewrite the parameter that needs to be changed for each function in a unit of address, whenever a function is changed. Since the changer 4 is provided, the size of the parameter file becomes greater. However, by providing the changer 4 beforehand from a beginning of the development, a memory shortage problem that is caused by an increase in a size of the parameter file during the development, will not occur. Further, regions of a same number as the functions do not necessarily need to be provided to the changer 4. Thus, redundancy can be reduced so that memory use efficiency can be improved.

<3. Rewriting of Parameters>

FIG. 3A is a schematic diagram of an example of the change information held by the changer 4.

The change information illustrated in FIG. 3A includes: collective change information that is used to collectively change the common parameters in the common portion 1 in a range of a plurality of serial addresses; and individual change information that is used to individually change the common parameters in the common portion 1 for individual addresses.

When a part of the common parameters in the common portion 1 is rewritten, in a case where the addresses of the parameters that are eliminated due to rewriting are sequential, the foregoing collective change information is used. Thus, number of times of sending a control command to the echo noise canceller 14 from the microcomputer 11 can be reduced, as compared to rewriting the parameters by specifying addresses of individual parameters. Therefore, it is possible to shorten time that takes to reset the parameters when a function is switched to another function selected by the controller 11B.

The collective change information of the change information illustrated in FIG. 3A includes: a collective change address table; collective change tables A to G; and a collective change rewriting parameter.

The collective change address table holds information of a top address of each of the collective change tables A to G.

In a case where a function 1 is selected by the controller 11B, the echo noise canceller 14 accesses a top address (1001h) of the collective change table A with reference to the collective change address table. In a case where a function 2 is selected by the controller 11B, the echo noise canceller 14 accesses a top address (1010h) of the collective change table B with reference to the collective change address table. In a case where one of functions 3 to 7 is selected by the controller 11B, the echo noise canceller 14 accesses a top address of a collective change table corresponding to the selected function, with reference to the collective change address table, like the case in which the function 1 or the function 2 is selected by the controller 11B.

FIG. 4 is a schematic diagram of an example of the collective change table A.

The top address (1001h) holds information of a first number of changes (000A00h). The first number of changes is a length of a range of a plurality of first serial addresses, i.e., a number of the parameters within the range of the first serial addresses.

A second address (1002h) holds a top address (200000h) of a first elimination parameter group. The elimination parameter group is a parameter group that is eliminated by the collective change, and is temporarily stored in the temporary memory 14A.

A third address (1003h) holds a top address (000000h) of a first rewriting parameter group. The rewriting parameter group is a parameter group that replaces the elimination parameter group by the collective change, and is stored in the library 11D.

A fourth address (1004h) holds information of a second number of changes (000500h). The second number of changes is a length of a range of a plurality of second serial addresses, i.e., a number of the parameters within the range of the second serial addresses.

A fifth address (1005h) holds a top address (210000h) of a second elimination parameter group.

A sixth address (1006h) holds a top address (010000h) of a second rewriting parameter group.

A seventh address (1007h) holds information of a third number of changes (000000h). When the information of the number of changes is 000000h, the information means that the collective change ends there. Therefore, the example of the collective change table A illustrated in FIG. 4 shows that two collective changes of the parameters are written.

Like the collective change table A illustrated in FIG. 4, the collective change table of the collective change information includes the number of changes, the top address of the elimination parameter group, and the top address of the rewriting parameter group. Like the collective change information illustrated in FIG. 3A, a routine process is performed in a predetermined address cycle (three-address cycle in FIG. 4) with reference to the collective change table by providing the collective change rewriting parameter group in addition to the collective change table. Thus, the control by the controller 11B becomes easy.

With reference back to FIG. 3A, the individual change information of the change information illustrated in FIG. 3A includes an individual change address table and individual change tables A to G.

The individual change address table holds information of a top address of each of the individual change tables A to G.

In a case where the function 1 is selected by the controller 11B, the echo noise canceller 14 accesses a top address (2001h) of the individual change table A with reference to the individual change address table. In a case where the function 2 is selected by the controller 11B, the echo noise canceller 14 accesses a top address (2010h) of the individual change table B with reference to the individual change address table. In a case where one of the functions 3 to 7 is selected by the controller 11B, the echo noise canceller 14 accesses a top address of an individual change table corresponding to the selected function, with reference to the individual change address table like the case in which the function 1 or the function 2 is selected by the controller 11B.

FIG. 5 is a schematic diagram of an example of the individual change table A.

The top address (2001h) holds information of a number of changes (000200h). When the information of the number of changes is 000200h, the information means that two parameters are changed.

A second address (2002h) holds an address of a first elimination parameter (000100h). The elimination parameter is a parameter that is eliminated by the individual change, and is temporarily stored in the temporary memory 14A.

A third address (2003h) holds a first change value, i.e., a parameter value (100000h) that replaces the first elimination parameter by the individual change.

A fourth address (2004h) holds an address of a second elimination parameter (000200h).

A fifth address (2005h) holds a second change value, i.e., a parameter value (200000h) that replaces the second elimination parameter by the individual change.

Like the individual change table A illustrated in FIG. 5, the individual change table of the individual change information includes the number of changes, the address of the elimination parameter, and the change value. After the number of changes is determined with reference to the individual change table, a routine process is performed in a predetermined address cycle (two-address cycle in a case of FIG. 5). Thus, the control by the controller 11B becomes easy.

Figure 6:
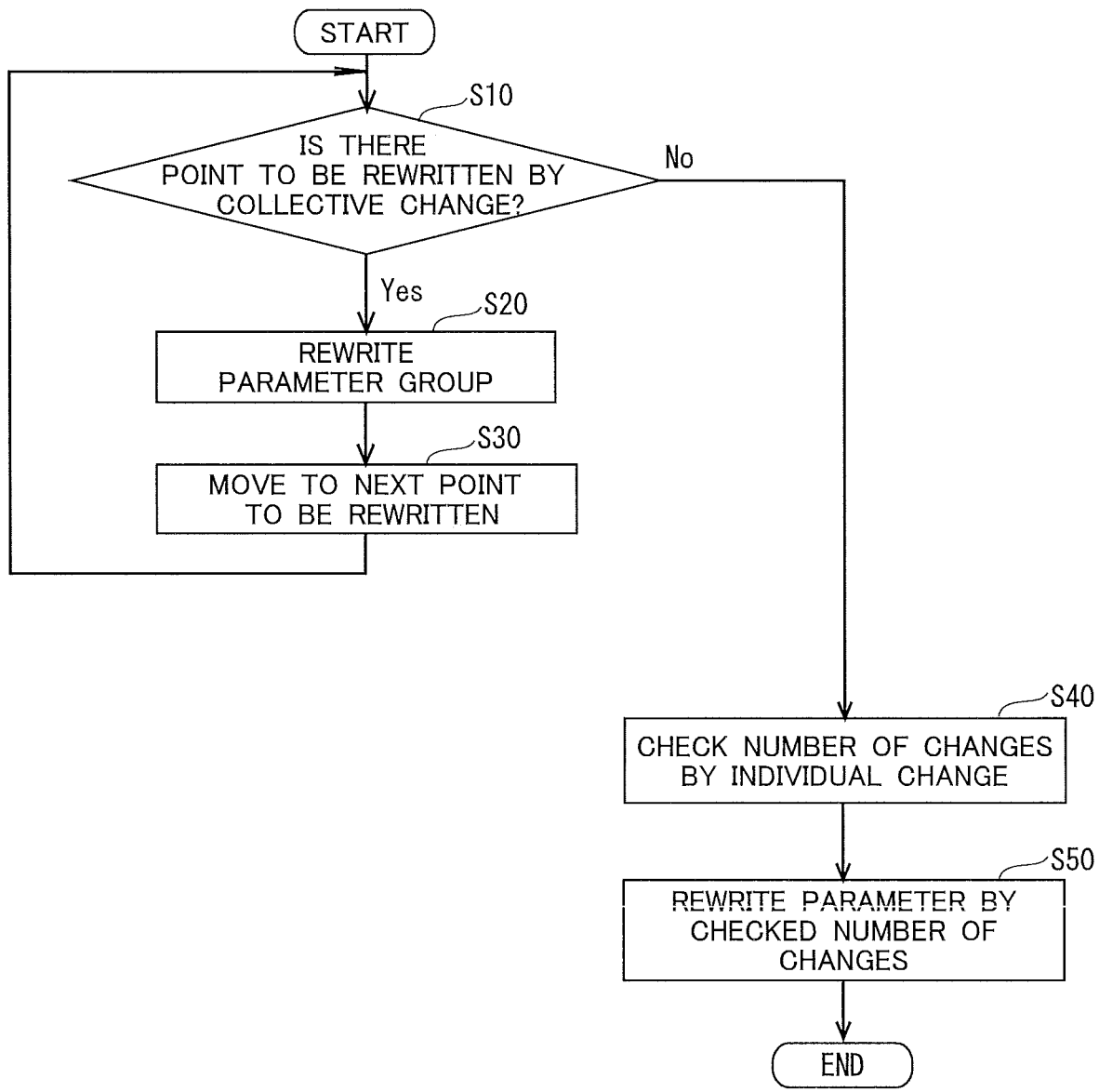
FIG. 6 is a flowchart indicative of an operation example of setting a parameter.

FIG. 6 is a flowchart indicative of an operation example of setting the parameter of the handsfree communication apparatus illustrated in FIG. 1. Whenever the function selected by the microcomputer 11 is changed, the handsfree communication apparatus illustrated in FIG. 1 starts the operation in the flowchart illustrated in FIG. 6.

First, the controller 11B checks a number of changes with reference to the collective change table corresponding to the function selected, to determine whether or not there is a point to be rewritten by the collective change (a step S10).

In a case where there is one point to be rewritten (Yes in step S10), the controller 11B sends the control command to the echo noise canceller 14. The echo noise canceller 14 rewrites, in accordance with the control command, the one point to be rewritten of the common parameter group in the common portion 1 stored in the temporary memory 14A (a step S20). In a step S30 following the step S20, the controller 11B accesses a next address that holds the number of changes in the collective change table corresponding to the function selected (the step S30). Then, the flowchart returns to the step S10.

In a case where there is no point to be rewritten (No in the step S10), the controller 11B checks a number of changes with reference to the individual change table corresponding to the selected function (the step S40). The controller 11B sends the control command to the echo noise canceller 14 to perform changes of the number. The echo noise canceller 14 rewrites, in accordance with the control command, by the checked number of changes, the common parameter in the common portion 1 stored in the temporary memory 14A for each address (the step S50). Once the process in the step S50 ends, the operation in the flowchart illustrated in FIG. 6 ends.

Due to the operation in the flowchart illustrated in FIG. 6, the changes of the common parameter in the common portion 1 can be performed completely based on the change information held by the changer 4 of the parameter file.

<4. Note>

In addition to the foregoing embodiment, various changes can be made to the technical features disclosed in this specification without departing from the scope of the technical purpose. In other words, the foregoing embodiment is only an example in all aspects and does not intend to limit the invention. The technical scope of the invention is defined by claims, and is not defined by the description of the foregoing embodiment. Thus, the technical scope of the invention should include the scope of the claims, equivalents thereof and any changes within the range of the technical purpose.

For example, according to the flowchart illustrated in FIG. 6, after the parameters are rewritten by the collective change, rewriting of the parameters by the individual change is performed. However, after the parameters are rewritten by the individual change, rewriting of the parameters by the collective change may be performed.

In the foregoing embodiment, the collective change table and the individual change table (one of the tables A to G) of the change information illustrated in FIG. 3A are referred to for each function. However, for example, in a case where i) the change contents of the parameters for the functions 2 to 7 are same, and ii) the change contents of the parameters are different between the function 1 and the functions 2 to 7, the change information illustrated in FIG. 3B may be used instead of the change information illustrated in FIG. 3A. In a case of the change information illustrated in FIG. 3B, a first group is formed for the function 1, and a second group is formed for the functions 2 to 7. A different collective change table and a different individual change table (one of the tables A and B) are referred to for each group. The configuration in which the different collective change table and the different individual change table are referred to for each group cab reduce redundancy, as compared to the configuration in which the collective change table and the individual change table are referred to for each function.

While the invention has been shown and described in detail, the foregoing description is in all aspects illustrative and not restrictive. It is therefore understood that numerous other modifications and variations can be devised without departing from the scope of the invention.

What is claimed is:

1. A signal processing apparatus comprising:
   a microcomputer that includes:
      a first memory that stores a single setting file including:
         a common portion that holds at least one common parameter that is used in common for a plurality of functions performed by the signal processing apparatus; a plurality of individual portions that each individually hold parameters for one of the plurality of functions; a work area; and a changer that holds change information to change the at least one common parameter in the common portion separate from the at least one common parameter;
      a controller; and
      a library; and
   a signal processor that processes a communication signal and includes a second memory;
   wherein the controller is configured to (a) implement sending of the common portion, the plurality of individual portions, the work area and the changer from the first memory to the library, (b) implement sending of the common portion, the plurality of individual portions and the work area from the library to the second memory, (c) select a selected function of the plurality of functions, (d) implement copying of the individual portion that holds the parameters for the selected function to a work area of the second memory, (e) implement, in the second memory, change of at least one parameter in the common portion based on the change information held by the changer, and (f) instruct the signal processor to process the communication signal using i) the individual portion copied to the work area of the second memory and ii) the at least one common parameter of the common portion that has been changed based on the change information from the changer.

2. The signal processing apparatus according to claim 1, wherein
   the change information includes: collective change information that is used to collectively change a plurality of the at least one common parameter in the common portion in a range of a plurality of serial addresses; and individual change information that is used to individually change the at least one common parameter in the common portion for individual addresses.

3. The signal processing apparatus according to claim 2, wherein
   the collective change information includes: information indicative of a length of the range of the plurality of serial addresses; address information of any of the at least one common parameter that is eliminated by the collective change; and address information of any common parameters that replace the any of the at least one common parameter that is eliminated by the collective change.

4. The signal processing apparatus according to claim 2, wherein
   the individual change information includes: address information of the at least one common parameter that is eliminated by the individual change; and a parameter that replaces the at least one common parameter that is eliminated by the individual change.

5. A parameter setting method for a signal processing apparatus that includes (1) a microcomputer having a first memory that stores a setting file, a controller and a library and (2) a signal processor that processes a communication signal and includes a second memory, the setting file includes a common portion that holds at least one common parameter that is used in common for a plurality of functions that are performed by the signal processing apparatus, a plurality of individual portions that each individually hold parameters for one of the plurality of functions, a work area and a changer that holds change information to change the at least one common parameter in the common portion separate from the at least one common parameter, the parameter setting method comprising the steps of:
   (a) sending the common portion, the plurality of individual portions, the work area and the change information to the library from the first memory;
   (b) sending the common portion, the plurality of individual portions and the work area from the library to the second memory;
   (c) the controller selecting a selected function of the plurality of functions;
   (d) copying of the individual portion that holds the parameters for the selected function to a work area of the second memory;
   (e) changing, in the second memory, at least one parameter in the common portion based on the change information; and
   (f) processing the communication signal using 1) the individual portion coupled to the second work area of the second memory and (2) the at least one common parameter of the common portion that has been changed based on the change information.

6. The signal processing apparatus according to claim 1, wherein the at least one common parameter used by the signal processor is changed based on the change information whenever a function of the plurality of functions is changed.

* * * * *